UNITED STATES PATENT OFFICE.

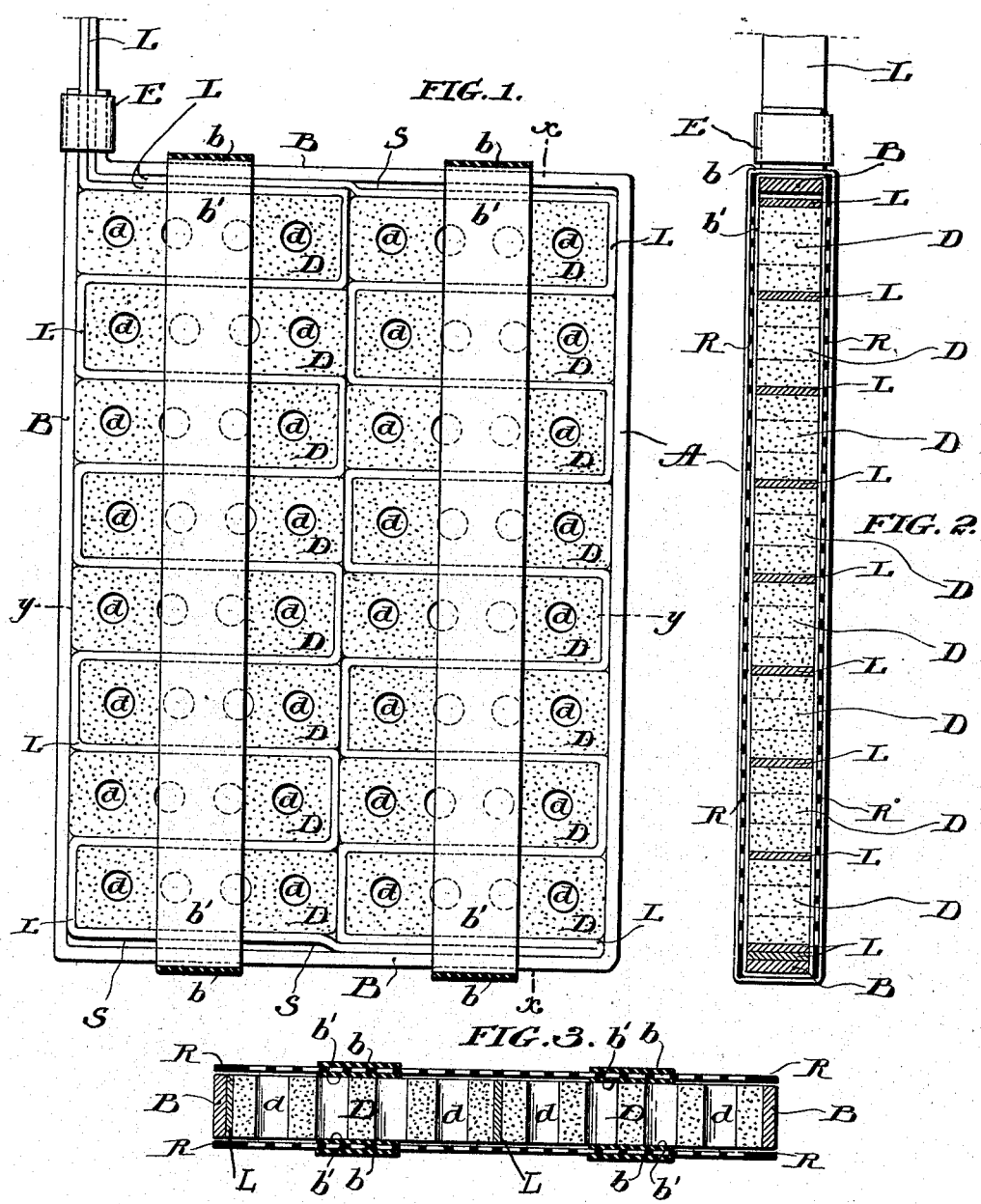

ISIDOR KITSEE, OF PHILADELPHIA, PENNSYLVANIA.

SECONDARY BATTERY.

SPECIFICATION forming part of Letters Patent No. 717,416, dated December 30, 1902.

Application filed April 10, 1893. Serial No. 469,822. (No model.)

*To all whom it may concern:*

Be it known that I, ISIDOR KITSEE, a citizen of the United States, residing at the city of Philadelphia, in the county of Philadelphia and State of Pennsylvania, have invented certain Improvements in Secondary Batteries, of which the following is a specification.

As is well known, secondary batteries are generally formed of plates of lead provided with active material placed in holes or cavities formed in such plates. In the use of secondary batteries of this description the exposed surfaces of lead eventually become unduly brittle and warp, and the action of the current occasions a scaling of such exposed surfaces, thereby causing a short-circuiting between the plates of opposite signs. In the case of the positive plate or electrode of the battery buckling is also occasioned by the fact that in the use of the battery the oxid of lead increases in volume without a corresponding increase of volume of its support.

My present invention has for its object the obviating the difficulties hereinbefore set forth; and it consists in the employment of a conductor in such a way as to expose the least possible surface of the same.

It consists also in the particular construction of the conductor, whereby expanding room is provided, as also an adjustable device capable of compensating for the contraction incident to the use of such electrode in a secondary cell, and also in the particular arrangement whereby a separating-plate is made part of such electrode and out of contact with the active material of such electrode.

Referring to the drawings, Figure 1 is an elevation of an electrode embodying my invention; Fig. 2, a sectional view on the line $x\ x$ of Fig. 1; Fig. 3, a horizontal sectional view on the line $y\ y$ of Fig. 1.

B is an encircling frame or band of conducting material; L, the conductor proper, bent in zigzag shape, so as to form spaces for the active material D, provided with holes or apertures $d$.

E is a ring or band of soft rubber holding together the ends of the encircling band B and the ends of the conductor proper, L. After the active material is placed in the spaces of the conductor and the encircling frame or band is placed around the conducting material soft-rubber bands $b'$ are placed around the whole plate. Adjacent to and upon these bands, on each side of the plate, is placed a perforated sheet of non-conducting material R, and to keep the same in position a second series of soft-rubber bands $b$ are carried around the separating-sheets R and the electrode.

The active material is shown in the form of blocks. Such blocks are molded independently and then placed in the spaces formed by the conductors; but the active material may also be plastered in said spaces without departing from the scope of my invention. As is also shown in Fig. 1, the conductor proper, L, is also bent so as to form on one series on the lower end and on the other series on the upper end an open space S, which space is provided partly to allow expanding room for the active material. In cases where either the band B or the ring E, or both, are inadequate of themselves fully to follow the expansion of the active material the spaces S can be made in proportion large enough to compensate for such expansion. I have found it more practical and better to provide for the whole electrode only these two spaces S, one for each series, and to provide these spaces between the conductor proper and the encircling band; but, if desired or preferred, such spaces may be provided in the inner faces of the conductor by shaping it in such form as will secure such spaces on its inner faces.

Having thus described my invention, what I claim as new, and desire to secure by Letters Patent, is—

1. An electrode for electric cells, comprising a conducting-strip bent so as to provide a series of spaces capable of expanding, independently-formed blocks of active material arranged within said spaces, said blocks being provided with holes or apertures, and means surrounding the electrode and located opposite the face-surfaces of said blocks for holding said blocks in place.

2. An electrode for electric cells, comprising a conducting-strip bent so as to provide a series of spaces, a series of perforated blocks removably arranged in said spaces, means for preserving the shape of said strip, and means surrounding the electrode and located opposite the face-surfaces of said blocks for holding said blocks in place.

3. An electrode for electric cells, comprising a conducting-strip bent in zigzag form to provide a series of spaces, a series of perforated blocks removably arranged in said spaces, means for preserving the shape of said strip, and means surrounding the electrode and located opposite the face-surfaces of said blocks for holding said blocks in place.

4. An electrode for electric cells, comprising a conducting-strip bent in zigzag form to provide a plurality of rows of expansible spaces, a series of perforated blocks removably arranged in said spaces, means for preserving the shape of said strip, and means surrounding the electrode and located opposite the face-surfaces of said blocks for holding said blocks in said spaces.

5. An electrode for electric cells, comprising a conducting-strip bent in zigzag form to provide a plurality of rows of expansible spaces, each of said rows having at one of its ends a space for permitting such expansion, a series of perforated blocks removably arranged in said spaces, means for preserving the shape of said strip, and means surrounding the electrode and located opposite the face-surfaces of said blocks for holding the blocks in said spaces.

In witness whereof I have hereunto set my signature in the presence of two subscribing witnesses.

ISIDOR KITSEE.

Witnesses:
 CHAS. C. COLLIER,
 GEO. W. REED.